March 30, 1948.  T. H. BARTH  2,438,532
SYNCHRONIZING BOMB SIGHT
Filed Sept. 28, 1932  9 Sheets-Sheet 1

Inventor:
T. H. Barth
by
Attorney

March 30, 1948.    T. H. BARTH    2,438,532
SYNCHRONIZING BOMB SIGHT
Filed Sept. 28, 1932    9 Sheets-Sheet 3

Inventor:
T. H. Barth
by
Attorney

March 30, 1948. T. H. BARTH 2,438,532
SYNCHRONIZING BOMB SIGHT
Filed Sept. 28, 1932  9 Sheets-Sheet 5

Inventor:
T. H. Barth
by Robert A. Lowndes
Attorney

March 30, 1948. T. H. BARTH 2,438,532
SYNCHRONIZING BOMB SIGHT
Filed Sept. 28, 1932 9 Sheets-Sheet 7

Inventor:
T. H. Barth
by
Robert A. Lavender
Attorney

March 30, 1948.  T. H. BARTH  2,438,532
SYNCHRONIZING BOMB SIGHT
Filed Sept. 28, 1932   9 Sheets-Sheet 8

Inventor:
T. H Barth
by
Attorney

Patented Mar. 30, 1948

2,438,532

UNITED STATES PATENT OFFICE 2,438,532

SYNCHRONIZING BOMB SIGHT

Theodore H. Barth, New York, N. Y., assignor to United States of America as represented by the Secretary of the Navy Application September 28, 1932, Serial No. 635,298

35 Claims. (Cl. 33—46.5)

This invention relates to a sighting device for aiming bombs that are dropped from aircraft and has among its numerous objects:

To provide a sight in which the movement of parts of the mechanism are synchronized to move in conformity with the apparent movement of the target whereby the sight is kept trained upon the target;

So to stabilize the optical parts of the sight that they will be unaffected by rolling or pitching of the craft upon which it is mounted;

To avoid the use of clocks or other timing devices and also of means for determining ground speeds apart from the actual operation of sighting;

To provide accurate means for correcting for the trail and cross-trail of the bomb; and To provide a bomb sight that will be simple and accurate in operation, durable in use and that will occupy a minimum of space and will add but little weight to an aircraft.

Wherever used throughout this specification and the claims thereto appended the words "right hand" and "left hand" are to be understood as being referred to the device as seen from the position of the operator of the sight.

Figure 1:
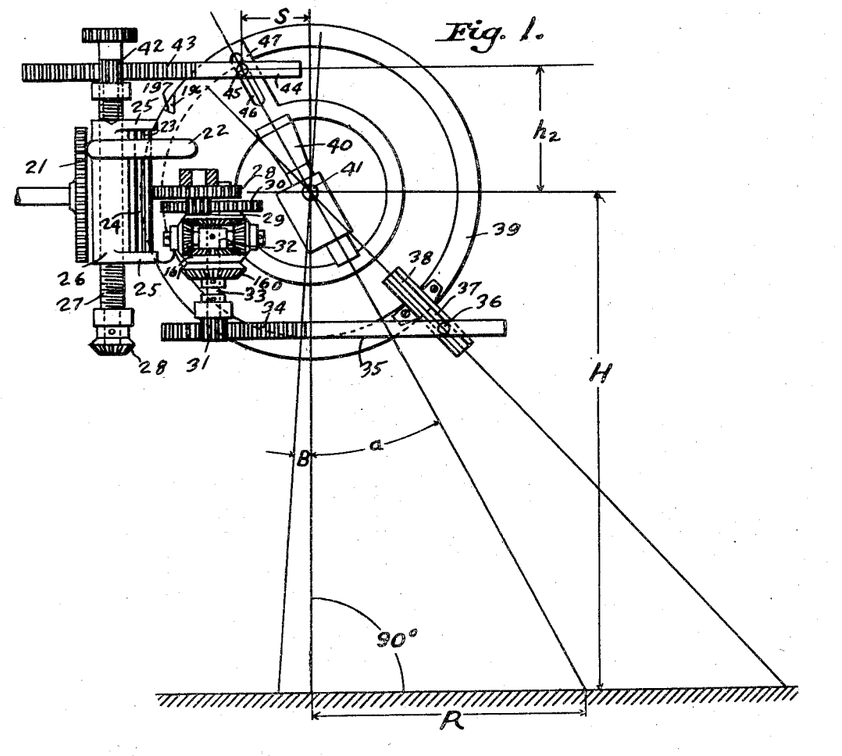
Figure 1 shows in detail certain operating parts of the mechanism and a schematic representation of the dimensional and angular quantities involved in the underlying principles thereof.

The essential parts of the sighting mechanism per se are shown somewhat schematically in Figure 1 wherein the driving disk 21, rotating at constant speed for any given altitude, is in frictional driving contact with roller 22 fixed on a spindle 23 whereof the major portion is longitudinally grooved to form the teeth of an elongated pinion 24. Shaft 23 is journalled in ears 25 that project laterally from an internally threaded sleeve 26 on screw 27, which sleeve is moved longitudinally of the screw when the latter is turned by means of bevel gear 28 thereon and cooperating elements, whereby roller 22 is moved a greater or less distance from the center of disk 21 and is caused to turn at different speeds.

Pinion 24 is meshed with a gear wheel 28 that is operatively connected to pinion 29 which drives gear wheel 30 that in turn drives pinion 31 through a differential gear designated as a whole by 32 and shaft 33 upon which pinion 31 is mounted. The teeth of rack 34 on horizontally disposed ground speed bar 35 are meshed with pinion 31 whereby the bar is moved longitudinally at a speed depending upon the position of roller 22 with respect to the center of disk 21. A pin 36 fixed to bar 35 has pivotally mounted upon it a shoe 37 that is slidable in a radial slot lever 38 secured to indicator ring 39 to extend radially thereof whereby movement of bar 35 rotates ring 39. The sighting telescope 40 is operatively connected to ring 39 to be rotated about its trunnions 41 at the same angular speed as that of the ring.

An extension of screw 27 carries a pinion 42 that is meshed with the teeth of rack 43 on range bar 44 to which is attached a pin 45 that slides in a radially extending slot 46 in range quadrant 47; it is obvious that rotation of screw 27 will shift rack 43 and so turn quadrant 47 through an angle $a$ which is $$\tan^{-1}\frac{S}{h_2}$$

which is readily seen to be equal to $$\tan^{-1}\frac{R}{H}$$

where R is the range and H the altitude of the trunnions of telescope 40, which is shown as being on the target and inclined at the range angle, i. e., in the position it has at the time the bomb is dropped. Actually, however, the line of sight through the telescope is parallel to the line through pin 36 and trunnion 41 and is rotated in the clockwise sense until the telescope reaches the position shown, when the bomb is released. The ratios of the several gears and the proportions of the lever arms involved are such that when screw 27 is turned to position roller 22 on disk 21 at such distance from the center of the disk that ground speed bar 35 is driven at a proper speed to keep the telescope 40 trained upon the target (that is, its movement is synchronized with the apparent motion of the target) range quadrant 47 is set so that the reference line thereon indicates the dropping angle on a range scale. The mentioned reference line lies on the line through the center of rotation of the quadrant and through pin 45, and when in the zero position should be vertically above the center of rotation of the quadrant. The trail correction may be introduced by moving the reference line on the quadrant clockwise beyond the zero position through an angle B equal to the trail angle of the bomb to be used, which does not affect the relative position of roller 22 on disk 21, as will be hereinafter explained.

Figure 13:
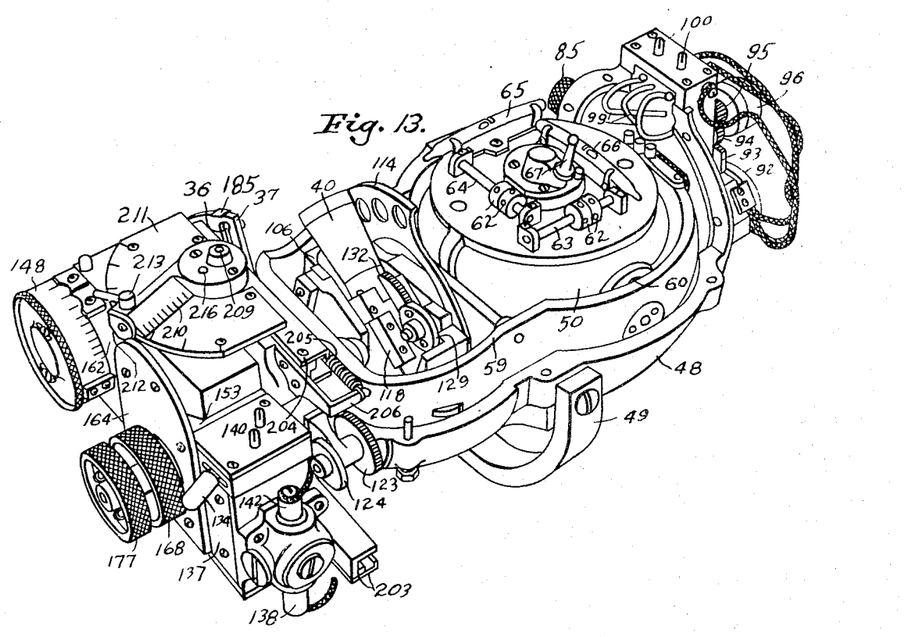
Figure 13 is a perspective view of the mechanism with the casing removed, taken from the forward side and at the left.
Figure 14:
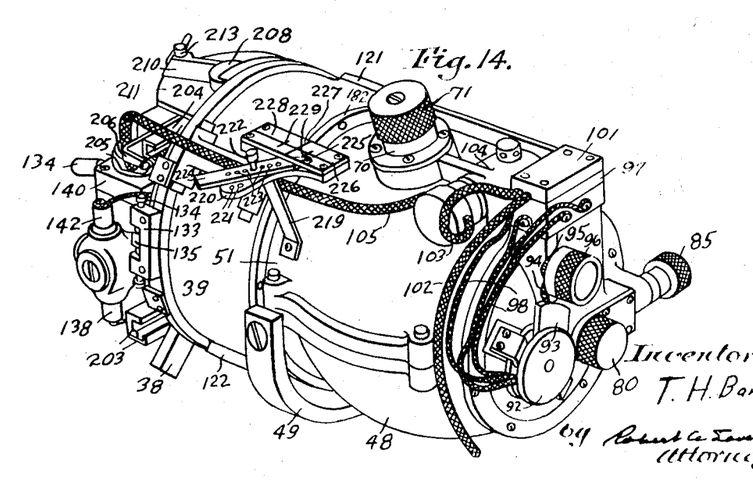
Figure 14 is a view similar to Figure 13 but with the casing in place and from the opposite end.

As is shown in Figures 13 and 14 the mechanism is carried by a lower casing member 48 that is pivotally mounted in a bail 49 seated in a fork, capable of rotation about a vertical axis (not shown). The enclosure is completed by an upper casing member 51 having in it a large window 52 to permit observation of the upper side of the gyro and a circumferentially extending cut away portion 53 adjacent the upper end of telescope 40 to permit of observation through the telescope as it turns about a horizontal axis in following the target. There is a like cut away portion 54 in lower casing member 48 adjacent the objective end of the telescope.

Figure 11:
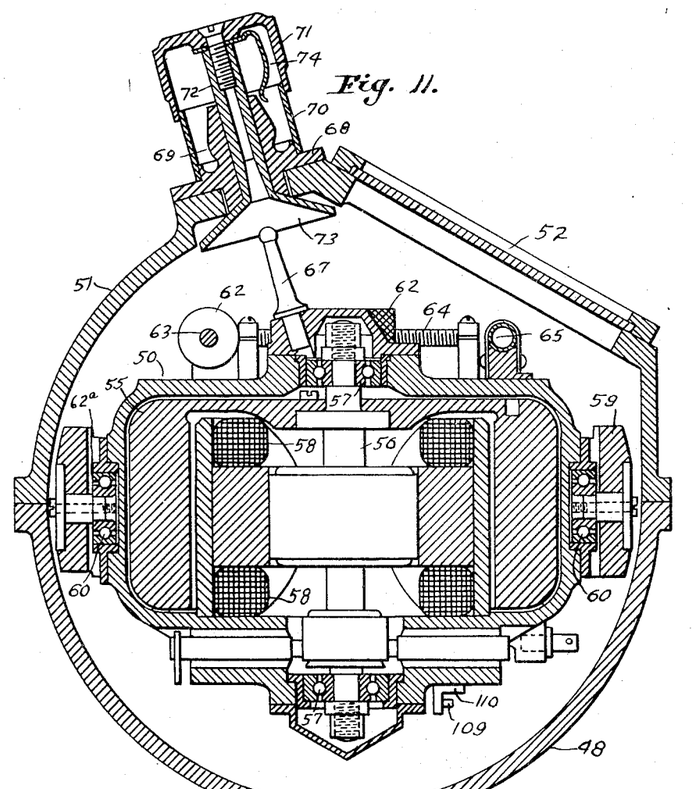
Figure 11 is a vertical cross sectional view on the line 11—11, Figure 3.

The gyro (Figure 11) comprises a heavy rotor 55 mounted upon shaft 56 journalled in antifriction bearings 57 to surround a plurality of field coils 58, the whole being supported from cardan 59 by anti-friction bearings 60 at right angles to the vertically disposed spin axis of the gyro and also at right angles to the anti-friction bearings 61 that support the cardan in lower casing member 48. Bearing outer race 62a is free to slide in its support to prevent thrust on the bearings that mount the gyro in the cardan and so avoid trouble from a shifting gyro. The opposite like bearing is not so movable. Upon the upper surface of the gyro are balancing weights 62 movable along screw threaded members 63 and 64 arranged at right angles to each other, respectively parallel and perpendicular to the axis of rotation of the cardan, and similarly disposed spirit levels 65 and 66. Gyro locking pin 67 is inclined forwardly to leave generous window space for observing the upper surface of the gyro and adjusting the balancing weights, etc. Upon casing member 51, positioned over locking pin 67, is a bushing 68 having a bulbous portion 69 on its outer surface, around which is a cylindrical sleeve 70 spaced therefrom. A cup-shaped cap 71 is slidable on sleeve 70 and is secured to the upper end of a hollow stem 72 that terminates at its lower end in obtuse frusto-conical skirt 73; the bore of stem 72 adjacent the skirt 73 is upwardly tapered. A spring locking member 74 is secured between cap 71 and stem 72 and is adapted to engage the bulbous portion 69 to lock cap 71 in a depressed position after the cap has been pushed down. When cap 71 is moved downwardly the skirt 73 guides the upper end of locking pin 67 into the tapered bore of stem 72 and the gyro is restrained against movement about any horizontal axis.

Figure 12:
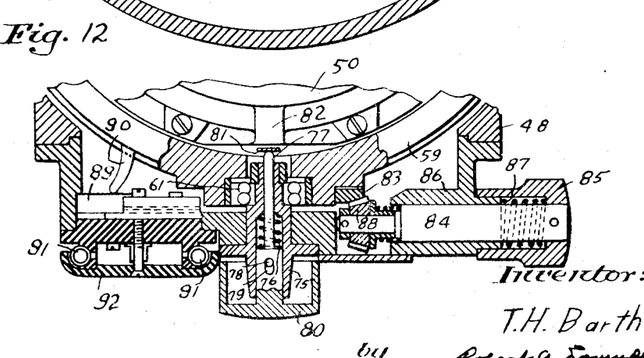
Figure 12 is sectional detail view of the means for applying precessing torques to the gyro.

In the left hand end of the sight casing is a bushing 75 having a bore whereof the outer portion is enlarged to accommodate a spring 76. A pin 77 passes through the bushing and has a stud 78 that is disposed in a slot 79 in a boss formed in knob 80, the spring 76 being disposed between the free end of the boss and the shoulder in the bore of bushing 75. A flat spring 81 has one end attached to cardan 59 and is placed to contact the inner end of pin 77; pushing in on knob 80 forces spring 81 against a rib 82 on the gyro housing and causes the gyro to precess whereby it is levelled in the fore and aft direction. Athwartship levelling of the gyro is effected by means of a rack 83 on the gyro housing that is engageable with a pinion 88 on shaft 84 connected to knob 85 to turn therewith. Shaft 84 passes through a sleeve 86 on the casing and a spring 87 is disposed between the sleeve 86 on the casing and a spring 87 is disposed between the sleeve and within knob 85 to hold the pinion 88 out of mesh with rack 83. When knob 85 is pushed in and rotated a torque is applied to the gyro through pinion 88 and rack 83 that causes the gyro to precess and adjust the level thereof in the athwartship line.

Mounted on the left hand end of the sight casing is a commutator 89 that is lightly contacted by a brush 90 of thin Phosphor bronze carried by the cardan. The commutator has an insulating segment disposed between arcuate lateral conducting segments so that when the brush is on the insulating segment the indicators connected to the commutator read zero but when it is on either of the conducting segments the indicators show to the pilot and the sight operator the direction of tilt of the casing with respect to cardan 59. Resistances 91 covered by a cap 92 are operatively connected to the commutator. Numerous devices of this kind are well known and the structure thereof is not shown in detail to avoid multiplication of drawings. A sector gear 93 is connected to the commutator and the associated resistances, by means of which sector gear, pinion 94 meshed therewith, and pinion 95 connected to knob 96 the zero reading position of the commutator may be set to indicate to the pilot the flight position of the plane desired by the sight operator. The several parts of the commutator and resistances are connected to terminal block 97 by wires 98, the block 97 being connected to the indicators (one each for the pilot and the sight operator) by wires 99. Terminal block 97 has resilient prongs 100 to contact suitable members in block 101 whereby block 97 is connected to supply wire 102. Wire 103 connects with lamp 104 that illuminates the upper surface of the gyro to the supply line and wire 105 carries current to the servomotor.

Figure 17:
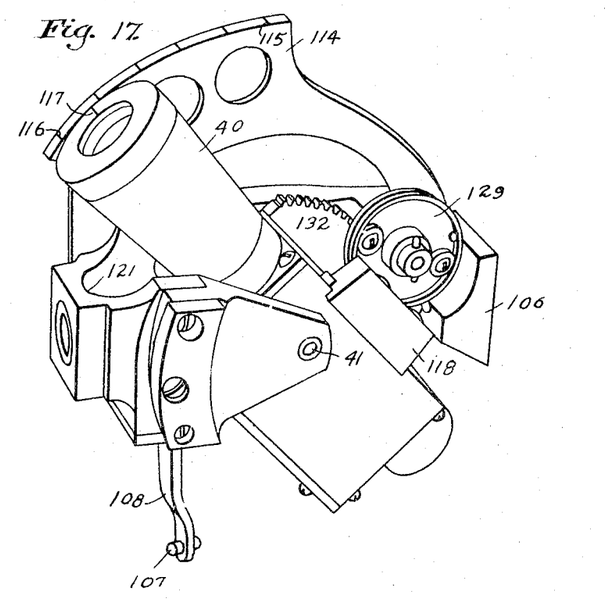
Figures 17 and 18 are detail views of the telescope and the cradle in which it is mounted.
Figure 18:
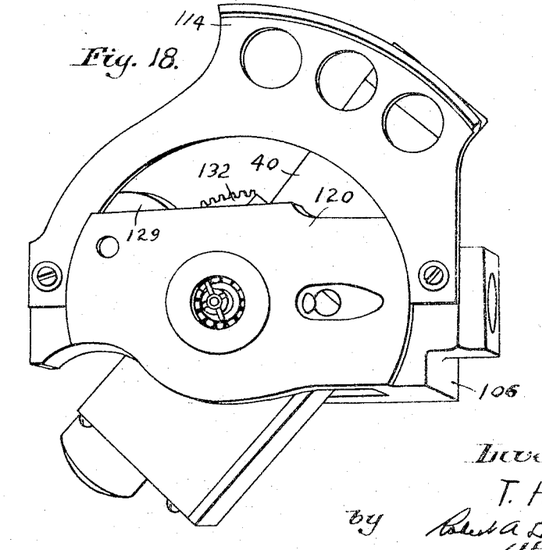

Cradle 106 in which the telescope 40 is mounted is stabilized by gyro 50 through a link 113 that is pivoted on pin 107 carried by arm 108 that extends downwardly from cradle 106 and to pin 109 on a bracket 110 fixed to the lower side of the gyro. Cradle 106 is mounted on anti-friction bearings 111 carried by gudgeons 112 in cardan 59, extends parallel to the tilt axis of the gyro and is so held by the gyro as to keep the telescope 40 in a vertical plane. A sector 114 mounted on cradle 106 adjacent the telescope has on it marks 115 and 116 indicating respectively the vertical position and the position of greatest inclination of the telescope with other marks indicating intermediate angular positions. Mark 117 on the telescope lies on a diameter of the telescope at right angles to the plane of tilting of the telescope on its trunnions 41 and serves as a reference line for reading the angular position of the telescope on sector 114. Telescope 40 is statically balanced on its trunnions by a suitable counterpoise 118.

A flat spiral spring 119 that is mounted in a housing 120 at the left hand side of the telescope has one end fixed to the adjacent telescope trunnion and the other end attached to the housing and is tensioned in a sense that tends to move the telescope backwardly to the position of greatest inclination, at which point the telescope rests against the cradle at 121. The term "backwardly" as applied to the telescope is to be understood as meaning away from the vertical and "forwardly" as meaning toward the vertical.

Figure 20:
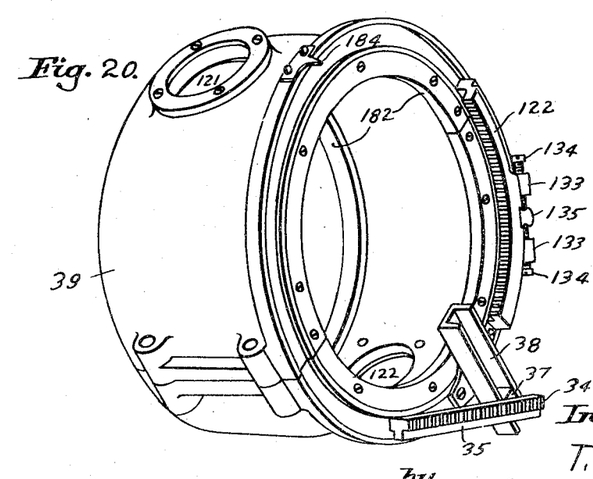
Figure 20 is a detail perspective view of the indicating ring and the driving elements therefor carried thereby.

Indicator ring 39, which is rotatable on casing members 48 and 51, has diametrically opposite windows 121 and 122 that are kept aligned with telescope 40 and through which the telescope is sighted. Indicator ring 39 is driven by ground speed bar 35 and carries an arcuate rack 122 that is meshed with a gear 123 on the same shaft with a cable drum 124. Phosphor bronze cable 125 has one end attached to drum 124 in such position that there will always be a portion of the cable bent around the drum. From the drum, cable 125 passes around a sheave 126, through the adjacent Cardan axis, around sheaves 127 and 128, through the axis of cradle 106, and around drum 129 to which the other end is secured in the same manner as above mentioned. A pinion 130 is secured on the same shaft 131 as is drum 129, which shaft is journalled in cradle 106. Pinion 130 engages a gear sector 132 secured to telescope 40 whereby rotation of the drum 129 by unwinding cable 125 therefrom will move the telescope forwardly against the torque exerted thereon by spring 119. As indicator ring 39 is turned rack 122 drives gear 123 and winds cable 125 up on drum 124 which unwinds it from drum 129. The cable does not stretch appreciably and the lengths of free cable between any two adjacent sheaves is sufficient to prevent any injurious twisting thereof by lateral tilting of cradle 106 or by tilting of cardan 59 upon which sheaves 127 and 128 are mounted. Ears 133 on indicator ring 39 carry screws 134 bearing against a lug 135 on rack 122 whereby the rack can be moved circumferentially of ring 39 to permit telescope 40 to rest against its cradle without any slack. Indicator ring 39 is made in two parts for ease of assembly and disassembly and drum 124 is provided with apertures 136 through which a pin may be inserted to engage a stationary part of the device to prevent rotation of drum 124 and the consequent slacking of cable 125 when the indicator ring is removed from its operative position. The above described means for tilting the telescope prevents applying to cardan 59 or cradle 106 any stresses that might cause the gyro to precess and in addition greatly diminishes the weight of parts that are stabilized by the gyro, thus reducing to a minimum the work required for stabilization.

Figure 2:
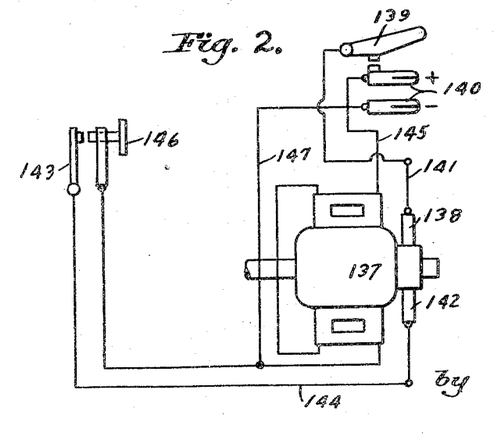
Figure 2 is a wiring diagram of the servomotor and the governor for controlling the speed thereof.

Power for operating indicator ring 39 and telescope 40 is provided by a servomotor 137 having a brush 138 connected to switch 139 in terminal block 140 by wire 141 and a brush 142 connected to governor controlled contact 143 (Figure 2) by a wire 144. Terminal block 140 is connected to the field of the servomotor by wire 145 and to governor controlled contact by wire 147, the field of the motor being also connected to contact 146. Servomotor 137 is shunt wound with a constantly excited field and should have a maximum speed slightly higher than the highest speed that will be required for operation at the lowest altitudes at which the sight will be used. The speed of motor 137 is controlled by a governor connected to motor shaft 247. The governor 162 is of the type disclosed in my copending application, Serial Number 551,008, filed July 15, 1931, now Patent 1,936,577, granted November 28, 1933. Since the servomotor is run at a definite speed for each altitude at which the sight is used the knob 148 that adjusts the governor for the various speeds carries a scale 149 calibrated directly in altitudes and when scale 149 is set at any altitude mark motor 137 will run at the correct speed for operation at that height.

Figure 15:
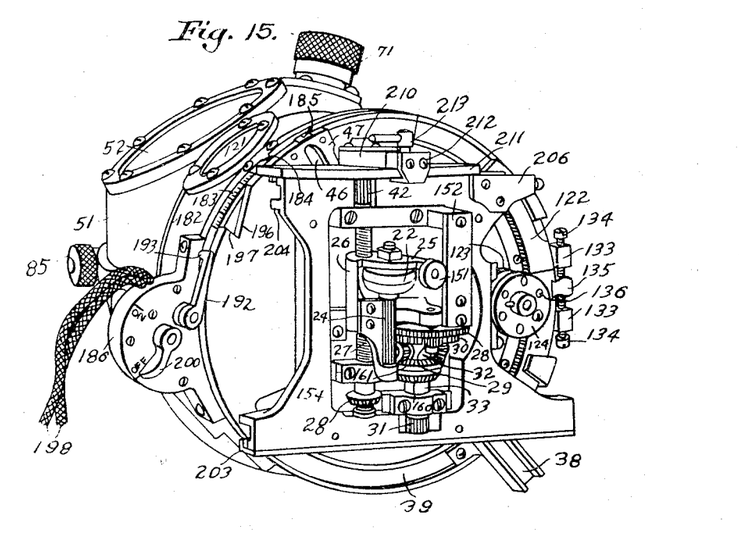
Figure 15 is a view of the assembly of the variable speed drive mechanism.
Figure 16:
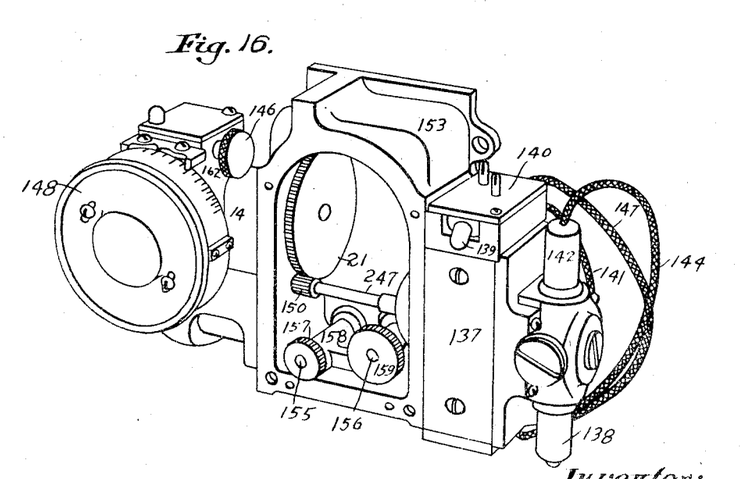
Figure 16 shows the altitude knob for regulating the speed of the servo motor and certain cooperating parts.

A pinion 150 on shaft 247 engages gear teeth on the periphery of disk 21 that drives roller 22 as above described. Disk 21 is urged outwardly by a spring to maintain a constant pressure of roller 22 against the disk. A roller 151 carried by ear 25 bears against a guide 152 to prevent roller 22 from moving away from disk 21. Servomotor 137, the governor mechanism, and disk 21 are mounted in a frame 153 that is removable as a unit from frame 154 that carries the range bar, the ground speed bar and the immediately associated operating parts. In the lower part of frame 153 are journalled two shafts 155 and 156, the former having on its outer end a pinion 157 and on its inner end a bevel gear 158 that engages bevel gear 28 (Figure 15) and the latter having on its outer end a gear 159 and on its inner end a bevel gear 163 that engages bevel gear 160 rigidly connected to bevel gear 161 of differential 32 and rotatable on shaft 33 to which is secured pinion 31 that drives ground speed bar 35.

Figure 4:
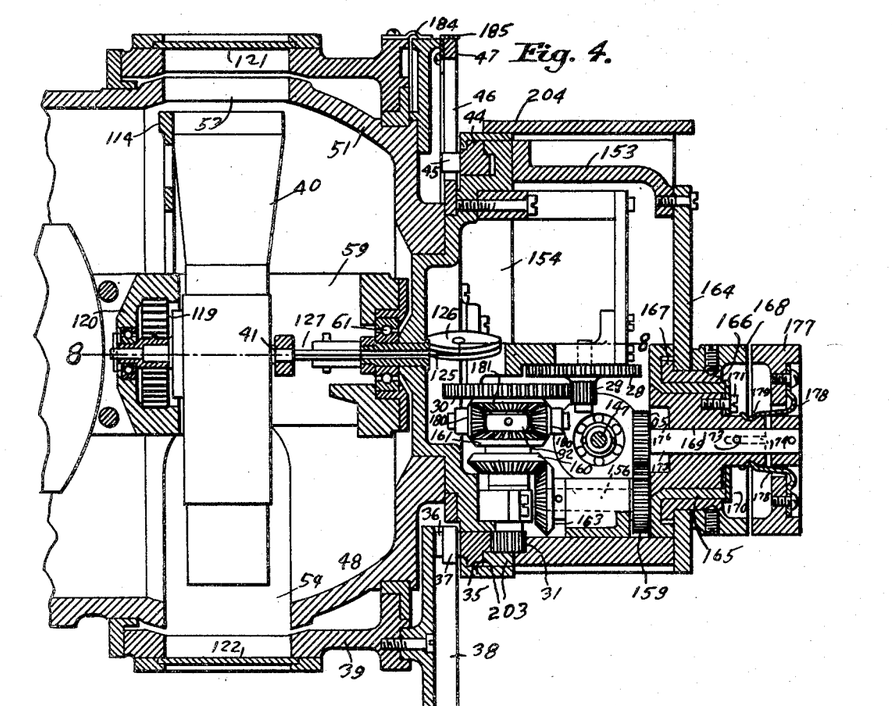
Figure 4 is a vertical sectional view substantially on the line 4—4, Figure 3, but with the sighting telescope in a vertical position.

Against the outer face of frame 153 is secured a plate 164 (Figure 4) having an opening therethrough wherein is secured a sleeve 165 spaced from the edge of the opening. Sleeve 166 is rotatable on sleeve 165 and has formed on its inner end a gear wheel 167 that meshes with pinion 157. Synchronizing knob 168 is secured to the outer end of sleeve 166 and serves to rotate gear 167 which turns screw 27 through gear 157, shaft 155, bevel gear 158, and bevel gear 28. Since screw 27 carries the pinion 42 engaged with rack 43 on range bar 44 it is apparent that rotation of synchronizing knob 168 moves the range quadrant 47 and also changes the distance of roller 22 from the center of disk 21. Further, inasmuch as the rate of travel of ground speed bar 35 is determined, for any given speed of servomotor 137, by the position of roller 22 on disk 21 and as that position is set by rotation of screw 27, the movement of the ground speed bar is controlled through the synchronizing knob.

Rotatably mounted in sleeve 165 is a member 169 having a radially outwardly turned flange at its inner end to prevent its being displaced outwardly through sleeve 165. A ring 170 is secured to the outer end of member 169 and against the end of sleeve 165 by screws 171 to retain member 169 in the sleeve and also to permit of adjusting the friction developed in rotating the member 169 to prevent turning of the member by mechanical vibration or jar. Slidable in member 169 is a shaft 172 that is constrained to rotate with the member by a pin 173 that projects from the shaft into a slot 174 in the member. When the shaft 172 is pushed inwardly a gear wheel 175 on the shaft engages gear 159 but when the shaft is moved outwardly gear wheel 175 seats in a recess 176 in member 169. Operating knob 177 is fixed on the outer end of shaft 172 and carries spring clips 178 that have curved portions 179 to engage depressions in a part of member 169 to hold the shaft 172 in the innermost position.

When operating knob 177 is pushed in and rotated the motion is transmitted from gear 175 to gear 159, shaft 156, and bevel gear 163 to bevel gears 160 and 161, the latter of which is meshed with pinions 180 of differential 32, which pinions are mounted on shafts that are in driving connection with the shaft 33 that carries pinion 31 which drives ground speed bar 25. Bevel gear 181 of the differential 32 will be held stationary (when the servo is not running) and therefore pinions 180 will be driven around bevel gear 181 by bevel gear 161 and thus will rotate shaft 33 and drive the ground speed bar which rotates the indicator ring 39 and thereby, through the mechanism above explained, turns telescope 40 about its horizontal axis at the same angular rate as that of the indicator ring and keeps the telescope aligned with the windows 121 and 122 in the indicator ring.

When operating knob 177 is pushed in but not turned and the servomotor is running the friction of member 169, acting through gears 175, 159, and 163 holds bevel gears 160 and 161 stationary while disk 21 acts through roller 22, pinion 24, gear 28, pinion 29, gear 30 and bevel gear 181 to cause pinions 180 to travel over the bevel gear 161 to rotate shaft 33 and so drive ground speed bar 35, indicator ring 39 and telescope 40. If the servo is running and knob 177 is rotated while pushed in the differential will impart to the ground speed bar a movement which is the algebraic sum of the rotations of the knob and of the servomotor. Annular shoes 182 at the ends of indicator ring 39 form the bearings for the ring upon the sight casing members and also aid in excluding dirt and moisture from entering the mechanism through the cut away portions 53 and 54 in the casing members, the shoes being formed in two parts with their line of separation corresponding to that of the halves of ring 39. No movement of the ground speed bar takes place when the servomotor is running if operating knob 177 is pulled out since the pinions 180 merely cause bevel gears 160 and 161 to turn as a unit with the other parts of differential 32.

Figure 19:
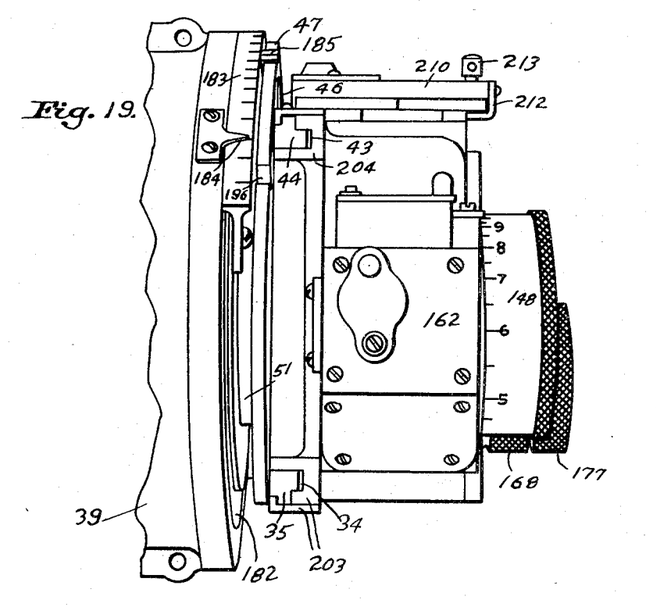
Figure 19 shows in detail some features of the range angle scale and the altitude knob.

A range angle scale 183 is mounted on casing member 51 between range quadrant 47 and ring 39. Ring 39 carries an index 184, that extends over the range angle scale and in alignment with line 117 on the mounting of the telescope ocular and also the sighting cross line of the telescope and range quadrant 47 has on its edge a small piece of metal on which is a reference line 185 that shows the range angle for which the sight is set.

Figure 9:
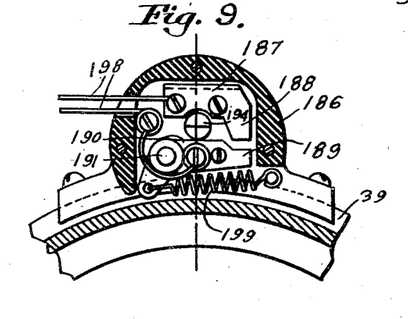
Figures 9 and 10 are detail views of the automatic bomb release switch.
Figure 10:
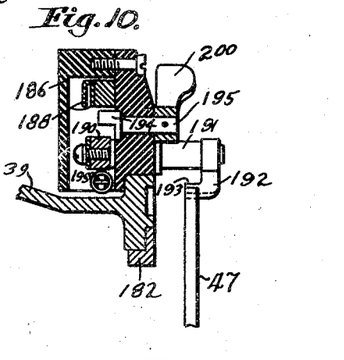

Bombs may be automatically released when the craft has reached the range angle with respect to the target after the sight has been properly synchronized, by a mechanism now to be described. A block 186 of suitable insulating material is mounted on indicator ring 39. In this block is disposed a stationary switch element 187, preferably having two resilient portions 188 separated a distance somewhat less than the thickness of the coacting blade 189 of movable switch element 190. Element 190 is in the form of a bell crank lever whereof the blade 189 is the longer arm and is mounted on a pin 191 that extends out through block 186 and carries a lever 192 having a laterally turned portion 193 that is adapted to ride on the edge of range quadrant 47. A spring 199 under tension has one end connected to the short arm of switch element 190 and so tends to close the switch by contacting blade 189 with portions 188 of the fixed element 187. A safety cam 194 mounted on a pin 195 that is rotatable in block 186 may be turned by finger lever 200 to prevent accidental closing of the switch and when turned to the safety or "off" position the portion 193 of lever 192 is held away from the range quadrant and closing of the switch is prevented. In the periphery of quadrant 47 is a notch 196 with a radial edge 197 that is spaced from line 185 the same distance as is the rear edge of portion 193 of lever 192 from the point of index 184. When lever 195 is turned to the "on" position and ring 39 is rotating forwardly or clockwise the portion 193 slides on quadrant 47, due to the pull of spring 199, but the switch is prevented from closing by the contact of portion 193 on the quadrant. As the portion 193 clears the edge 197 of notch 196 lever 192 is turned down into the notch and the switch is closed, which closes the circuit through wires 198 to actuate the bomb release mechanism. The automatic release occurs at the instant that the point of index 184 is aligned with the reference line 185 on the range quadrant. If manual release is used the bomb is dropped when index 184 and line 185 are in exact coincidence.

Figure 6:
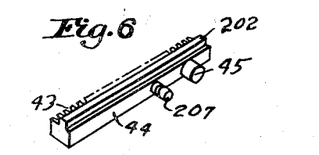
Figure 6 is a detail view of the range bar.
Figure 7:
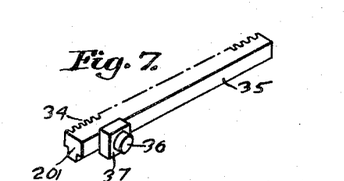
Figure 7 is a detail view of the ground speed bar.
Figure 8:
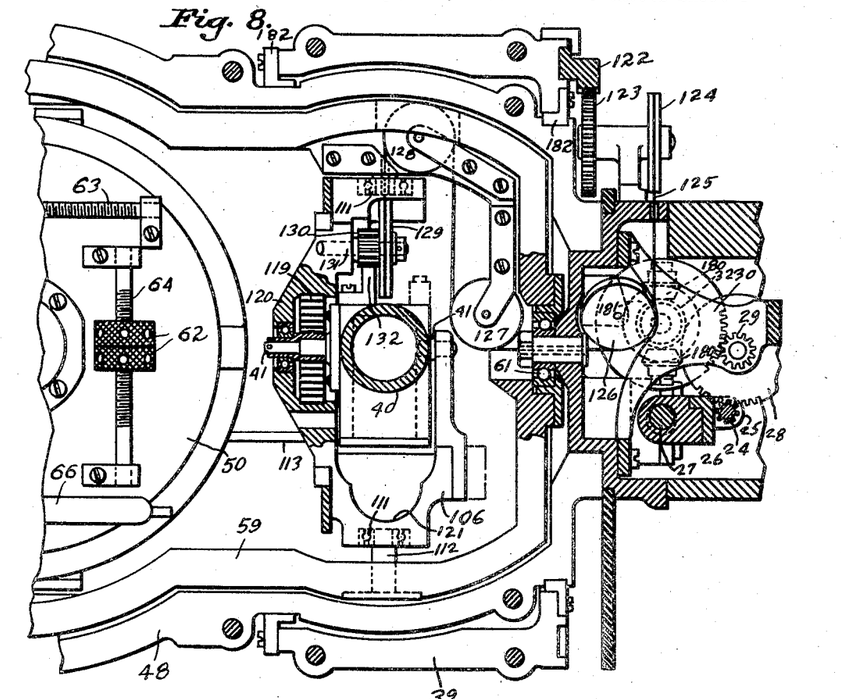
Figure 8 is a longitudinal transverse sectional view substantially on the line 8—8, Figure 4.

Ground speed bar 35 and range bar 44 are formed with the ribs 201 and 202, respectively, and slide in guides 203 and 204, respectively, which fit closely all surfaces on the bars and prevent any lateral movement of the bars. A spring 205 has one end attached to a bracket 206 secured to frame 154 and the other to a pin 207 on range bar 44 and is kept under tension to prevent any back lash or looseness of pin 45 in slot 46 in the range quadrant.

Figure 5:
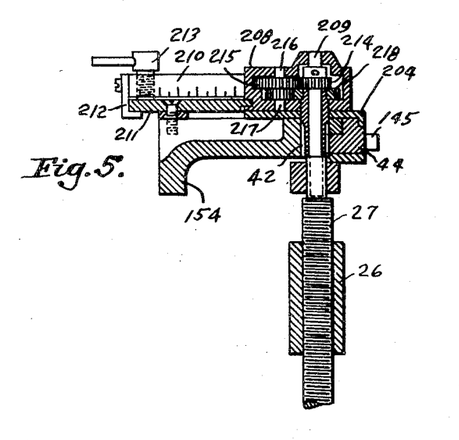
Figure 5 is a detail view of the trail correction mechanism of the sight.

Figure 5 shows the means for putting the trail angle correction into the range angle indication. A gear housing 208 is rotatable on an unthreaded portion 209 that extends upwardly from screw 27 and is connected to a lever 210 that is slidable over a trail angle scale 211 secured to the upper surface of frame 154. A clip 212 fixed to lever 210 extends over the edge of scale 211 and into contact with the lower surface of the scale against which it may be drawn by means of a screw 213 mounted in lever 210 to lock the lever against casual displacement. The forward edge of lever 210 is calibrated to aid in reading a series of curves (not shown) that may be placed on scale 211 to indicate trail angles for various types of bombs at different altitudes. A pinion 214 is secured on portion 209 and meshes with a gear 215 on a shaft 216 journalled in housing 208, upon which shaft the pinion 217 is also carried. Pinion 42 that drives range bar 44 is free to turn on portion 209 but is in driving engagement with pinion 218 which meshes with pinion 217. It will be observed that as lever 210 is rotated gear 215 and pinion 217 will be bodily carried thereby, but since pinion 214 is held stationary gear 215 and pinion 217 will be caused to rotate due to the engagement of the gear 215 with pinion 214, which rotation will be transmitted to pinions 218 and 42 and so drive range bar 44 and move range quadrant 47 through the same number of degrees as lever 210 is moved over scale divisions on scale 211. It is of course understood that the trail angle is subtracted from the value the range angle would have in the absence of trail. However, turning of screw 27 does not affect the setting of the trail correction lever, since in that case gear 215 and pinion 217 merely turn with their common shaft and transmit the movement from pinion 214 to pinion 218 and hence to the range bar.

Figure 3:
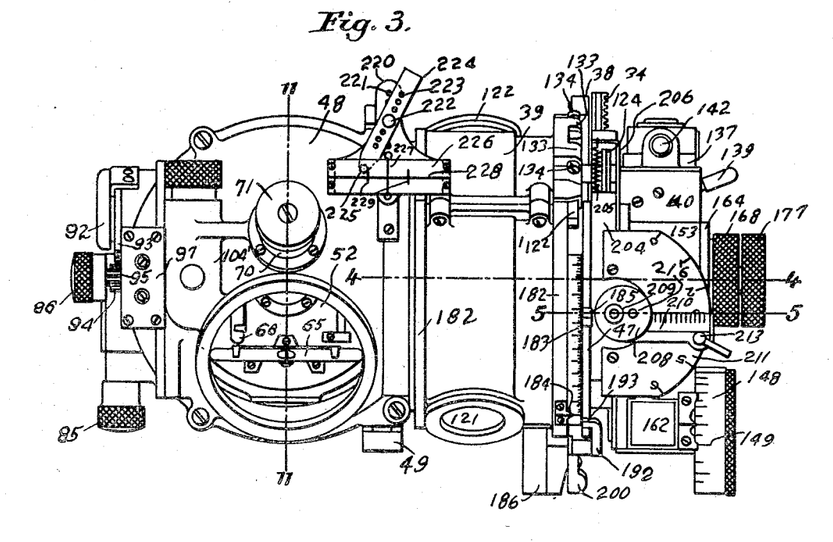
Figure 3 is a top plan view of the assembled sight.

The cross-trail correction device is mounted upon a bracket 219 fixed to casing member 51 from which a bar 220 projects forwardly. Bar 220 has in it threaded holes 221 spaced to represent trail angles from 1⅓ degrees to 4⅓ degrees, in steps of one-third degree. A screw 222 is passed through holes 223, having the same spacing as holes 221, in cross-trail lever 224 into holes 221 and pivotally secures the leverage to bar 220. A wire (not shown) is attached to the forward end of lever 224 and is fixed by means of a spring to the fuselage to hold the lever parallel to the fore and aft line of the craft. The after end of lever 224 has on it a blackened spot 225 and moves under a transparent plate 226 that has on it cross lines 227 and 228 corresponding to those in the telescope reticule and short vertical lines 229 across the athwartship line equally spaced from the vertical line 227, there being like disposed lines in the reticule. When the sight is turned about a vertical axis to hold it on a target lever 224 will be kept parallel to the fore and aft line and so lever 224 will be turned away from line 227 through an angle equal to the drift of the craft and spot 225 will appear displaced from the intersection of the cross lines. The cross-trail correction is applied by directing the pilot, by means of the pilot director, and setting the sight to cause the target to have the same relative position with respect to the cross lines in the telescope as does spot 225 with reference to the lines on plate 226. The lines 229 and their counterparts in the reticule are used as reference lines to make accurate estimating of the position of the spot 225 and of the target in the reticule more rapid and certain. For example, under conditions as shown in Figures 3 and 14, the target would be held in the same position in advance of the athwartship line 228 and to the left of the corresponding vertical line 229 that is occupied by spot 225 in those figures. At the beginning of a bombing run screw 222 is set in the holes corresponding to the trail angle indicated by the setting of trail correction lever 210 which is determined by the type of bomb to be used and the altitude from which the bombs are to be dropped.

Operation

It is unnecessary for present purposes to describe the pilot directing, bringing the plane on a collision course, etc. It will be assumed that such details are executed at the proper times.

The main operating knob 177 being pulled out, indicator ring 39 and the telescope can be turned through about fifty degrees toward the operator, thus setting the line of sight forward, by pushing on radial slot lever 38 with the hand, which effects this operation much more rapidly than if the knob is manipulated to rotate the ring but the completion of the movement to the limiting position of the telescope must be done by means of the operating knob. Knowing the altitude at which the bombing is to be done the governor can be set by means of altitude knob 148 to cause servomotor 137 to run at the proper speed for that altitude. Trail correction lever 210 is set on scale 211 at the correct angle for the type of bomb and the altitude and screw 222 is set in the cross-trail correction device to correspond. A preliminary setting of the range quadrant 47 is made based upon an estimate of the ground speed and on the known altitude.

As the target is approached the sight is set with the target in the field but slightly in advance of the cross line and the servomotor is started, which attains a steady speed about the time the target is on the line; or, if preferred, the line may be moved forward to meet the target. Since this moving of the telescope is done with knob 177 pushed in, servomotor will be connected to the telescope and indicator ring through disk 21 and the gearing driven thereby. If the range quadrant is set at too great a range angle for the speed of the craft, roller 22 will be too far from the center of disk 21 and the target will drift forwardly off the cross line, and if the estimated range angle is too small it will drift backwardly. Using the operating knob, the line can be again set on the target and if the target again drifts off the range quadrant is reset until the sight stays on, at which time the movement of the telescope is correctly synchronized with the movement of the target. If the apparent drift is small the line may be set on the target by turning both knobs together, but if large the synchronizing knob should be given an additional part turn in the same sense. The foregoing description has been based upon conditions involving no cross-trail. If cross-trail exists the sight is synchronized with the target in its proper position in the field as indicated by the spot 225 on cross-trail lever in relation to the lines on plate 226.

After the sight has been synchronized with the target lever 200 is turned to the "on" position to permit lever 192 to ride on the edge of the range quadrant 47. Indicator ring 39 continues to rotate, driven by the servomotor, and at the instant index 184 carried thereby coincides with mark 185 on the range quadrant, i. e., when the telescope is inclined at the range angle, lever 192 drops into notch 196, the release switch is closed, and the bomb is dropped. As the portion 193 on lever 192 moves up the sloping side of notch 196 the release switch is gradually opened, but the circuit is not broken for several seconds. Switch lever 200 should be turned to "off" before returning indicator ring 39 to its initial position to lift release lever 192 so it will clear the notch 196.

The herein disclosed mechanism for actuating the telescope is very desirable in that while it realizes all the advantages of stabilizing the telescope and the operating parts connected therewith the load placed upon the gyroscope to accomplish the stabilization is small since only the telescope, the drum and gear immediately connected thereto and the supporting cradle therefor are actually controlled by the gyro.

It will be understood that the above description and accompanying drawings comprehend only the general and preferred embodiment of my invention, and that various changes in construction, proportion and arrangement of parts may be made within the scope of the appended claims without sacrificing any of the advantages of my invention.

I claim:

1. A bomb sight, comprising a casing, a cardan tiltably mounted therein, a gyro mounted in said cardan to tilt at right angles to the Cardan tilt, means to level said gyro, a cradle mounted in said cardan to tilt in the same sense as the gyro and connected to the gyro to be stabilized thereby, a sighting telescope mounted in said cradle to tilt in the same sense as the cardan, an arcuate rack secured to the telescope, a pinion engaging the said rack, a cable drum connected to the pinion, a sheave on the cardan adjacent the forward cradle axis, a second sheave thereon adjacent a Cardan axis, a third sheave exteriorly of the casing adjacent the same Cardan axis, a second cable drum, a cable having its ends respectively secured to the said drums and passing over all said sheaves and through both the said axes, an indicator ring rotatable on said casing around said telescope, said ring being provided with diametrically opposed windows through which the telescope may be directed upon a target, an arcuate rack carried by said ring, a gear engaged with said rack and operatively connected to said second cable drum whereby said cable is wound on said second cable drum and said telescope is rotated forwardly on its trunnions at the same angular rate as that of said ring, means to move said telescope backwardly upon backward movement of said ring, means to drive said ring, a range angle scale mounted on said casing adjacent said ring, an index on said ring extending over said scale, a range quadrant adjacent said scale and having thereon a reference line, means to set said quadrant to indicate by said line a range angle on said scale, said last mentioned means being connected to make an adjustment of the speed of the driving means for said ring simultaneously with the setting of said quadrant, means to adjust the speed of said driving means to correspond to a given altitude, means to correct the range angle indication for the trail of a bomb, means for indicating a cross-trail correction, and means to close automatically a circuit to actuate a bomb release mechanism at the instant of coincidence of said index with the said reference line on the range quadrant.

2. A bomb sight, comprising a casing, a cardan tiltably mounted therein, a gyro mounted in said cardan to tilt at right angles to the Cardan tilt, means to level said gyro, a cradle mounted in said cardan to tilt in the same sense as the gyro and connected to the gyro to be stabilized thereby, a sighting telescope mounted in said cradle to tilt in the same sense as the cardan, an arcuate rack secured to the telescope, a pinion engaging the said rack, a cable drum connected to the pinion, a sheave on the cardan adjacent the forward cradle axis, a second sheave thereon adjacent a Cardan axis, a third sheave exteriorly of the casing adjacent the same Cardan axis, a second cable drum, a cable having its ends respectively secured to the said drums and passing over all said sheaves and through both the said axes, an indicator ring rotatable on said casing around said telescope, said ring being provided with diametrically opposed windows through which the telescope may be directed upon a target, an arcuate rack carried by said ring, a gear engaged with said rack and operatively connected to said second cable drum whereby said cable is wound on said cable drum and said telescope is rotated forwardly on its trunnions at the same angular rate as that of said ring, means to move said telescope backwardly upon backward movement of said ring, manually operable means to rotate said ring, a range angle scale mounted on said casing adjacent said ring, an index on said ring extending over said scale, a range quadrant adjacent said scale and having thereon a reference line, means to set said quadrant to indicate by said line a range angle on said scale, means to correct the range angle indication for the trail of a bomb, means for indicating a cross-trail correction, and means to close automatically a circuit to actuate a bomb release mechanism at the instant of coincidence of said index with the said reference line on the range quadrant.

3. A bomb sight, comprising a casing, a cardan tiltably mounted therein, a gyro mounted in said cardan to tilt at right angles to the Cardan tilt, means to level said gyro a cradle mounted in said cardan to tilt in the same sense as the gyro and connected to the gyro to be stabilized thereby, a sighting telescope mounted in said cradle to tilt in the same sense as the cardan, an arcuate rack secured to the telescope, a pinion engaging the said rack, a cable drum connected to the pinion, a sheave on the cardan adjacent the forward cradle axis, a second sheave thereon adjacent a Cardan axis, a third sheave exteriorly of the casing adjacent the same Cardan axis, a second cable drum, a cable having its ends respectively secured to the said drums and passing over all said sheaves and through both the said axes, an indicator ring rotatable on said casing around said telescope, said ring being provided with diametrically opposed windows through which the telescope may be directed upon a target, an arcuate rack carried by said ring, a gear engaged with said rack and operatively connected to said second cable drum whereby said cable is wound on said second cable drum and said telescope is rotated forwardly on its trunnions at the same angular rate as that of said ring, means to move said telescope backwardly upon backward movement of said ring, means to drive said ring, a range angle scale mounted on said casing adjacent said ring, an index on said ring extending over said scale, a range quadrant adjacent said scale and having thereon a reference line, means to set said quadrant to indicate by said line a range angle on said scale, said last mentioned means being connected to make an adjustment of the speed of the driving means for said ring simultaneously with the setting of said quadrant, means to adjust the speed of said driving means to correspond to a given altitude means to correct the range angle indication for the trail of a bomb, and means for indicating a cross trail correction.

4. A bomb sight, comprising a casing, a cardan tiltably mounted therein, a gyro mounted in said cardan to tilt at right angles to the Cardan tilt, means to level said gyro, a cradle mounted in said cardan to tilt in the same sense as the gyro and connected to the gyro to be stabilized thereby, a sighting telescope mounted in said cradle to tilt in the same sense as the cardan, an arcuate rack secured to the telescope, a pinion engaging the said rack, a cable drum connected to the pinion, a sheave on the cardan adjacent the forward cradle axis, a second sheave thereon adjacent a Cardan axis, a third sheave exteriorly of the casing adjacent the same Cardan axis, a second cable drum, a cable having its ends respectively secured to the said drums and passing over all said sheaves and through both the said axes, an indicator ring rotatable on said casing around said telescope, said ring being provided with diametrically opposed windows through which the telescope may be directed upon a target, an arcuate rack carried by said ring, a gear engaged with said rack and operatively connected to said second cable drum whereby said cable is wound on said second cable drum and said telescope is rotated forwardly on its trunnions at the same angular rate as that of said ring, means to move said telescope backwardly upon backward movement of said ring, means to drive said ring, a range angle scale mounted on said casing adjacent said ring, an index on said ring extending over said scale, a range quadrant adjacent said scale and having thereon a reference line, means to set said quadrant to indicate by said line a range angle on said scale, said last mentioned means being connected to make an adjustment of the speed of the driving means for said ring simultaneously with the setting of said quadrant, means to adjust the speed of said driving means to correspond to a given altitude, and means to correct the range angle indication for the trail of a bomb.

5. A bomb sight, comprising a casing, a cardan tiltably mounted therein, a gyro mounted in said cardan to tilt at right angles to the Cardan tilt, means to level said gyro, a cradle mounted in said cardan to tilt in the same sense as the gyro and connected to the gyro to be stabilized thereby, a sighting telescope mounted in said cradle to tilt in the same sense as the cardan, an arcuate rack secured to the telescope, a pinion engaging the said rack, a cable drum connected to the pinion, a sheave on the cardan adjacent the forward cradle axis, a second sheave thereon adjacent a Cardan axis, a third sheave exteriorly of the casing adjacent the same Cardan axis, a second cable drum, a cable having its ends respectively secured to the said drums and passing over all said sheaves and through both the said axes, an indicator ring rotatable on said casing around said telescope, said ring being provided with diametrically opposed windows through which the telescope may be directed upon a target, an arcuate rack carried by said ring, a gear engaged with said rack and operatively connected to said second cable drum whereby said cable is wound on said second cable drum and said telescope is rotated forwardly on its trunnions at the same angular rate as that of said ring, means to move said telescope backwardly upon backward movement of said ring, manually operable means to rotate said ring, a range angle scale mounted on said casing adjacent said ring, an index on said ring extending over said scale, a range quadrant adjacent said scale and having thereon a reference line, means to set said quadrant to indicate by said line a range angle on said scale, and means to correct the range angle indication for the trail of a bomb.

6. A bomb sight, comprising a gyro mounted for tilting in two vertical planes at right angles to each other, a sighting device mounted adjacent said gyro and connected thereto to tilt in the same sense and to the same angular extent as said gyro, a rack connected to said device, a pinion engaged therewith and mounted to drive said rack, a cable drum connected to said pinion, means to indicate a range angle, means to indicate the relative angular position of said device with respect to said first mentioned means, a second cable drum, driving means connecting said second drum to said second mentioned means, guide means between said cable drums, a cable connected to and wound upon said drums and passing over said guide means and through two of the axes about which tilting of said device may occur, and means to actuate said second mentioned means.

7. A bomb sight, comprising a gyro mounted for tilting in two vertical planes at right angles to each other, a sighting device mounted adjacent said gyro and connected thereto to tilt in the same sense and to the same angular extent as said gyro, a rack connected to said device, a pinion engaged therewith and mounted to drive said rack, a cable drum connected to said pinion, means to indicate a range angle, means to indicate the relative angular position of said device with respect to said first mentioned means, a second cable drum, driving means connecting said second drum to said second mentioned means, guide means between said cable drums, a cable connected to and wound upon said drums and passing over said guide means and through two of the axes about which tilting of said device may occur, continuously acting means tending to move said device in opposition to the pull of said cable and means to actuate the second mentioned means.

8. A bomb sight, comprising a sighting device, means to stabilize said device against participation in angular movement of the body whereon said device is mounted, and means whereof the greater portion is unstabilized connected to said device to direct it upon a target without affecting the stabilization of said device.

9. A bomb sight, comprising a stabilized member tiltable about an axis, a sighting device tiltably mounted on said member, a rack carried by said device, a pinion engaging said rack, a first drum mounted on said member and connected to said pinion, a second drum mounted on an unstabilized member, a flexible member wound upon and having its ends connected to said drums, said flexible member passing through a tilt axis of said stabilized member, continuously acting means tending to move said device in opposition to said flexible member, a range angle scale mounted on an unstabilized member, movable indicating means disposed to cooperate with said scale, driving connections between said movable indicating means and said second drum, and means to actuate said movable indicating means.

10. A bomb sight, comprising a stabilized member tiltable about an axis, a sighting device tiltably mounted on said member, a rack carried by said device, a pinion engaging said rack, a first drum mounted on said member and connected to said pinion, a second drum mounted on an unstabilized member, a flexible member wound upon and having its ends connected to said drums, said flexible member passing through a tilt axis of said stabilized member, continuously acting means tending to move said device in opposition to said flexible member, a range angle scale mounted on an unstabilized member, movable indicating means disposed to cooperate with said scale, driving connections between said movable indicating means and said second drum, and power means to actuate said movable indicating means.

11. A bomb sight, comprising a stabilized member, tiltable about an axis, a sighting device tiltably mounted on said member, a rack carried by said device, a pinion engaging said rack, a first drum mounted on said member and connected to said pinion, a second drum mounted on an unstabilized member, a flexible member wound upon and having its ends connected to said drums, said flexible member passing through a tilt axis of said stabilized member, continuously acting means tending to move said device in opposition to said flexible member, a range angle scale mounted on an unstabilized member, movable indicating means disposed to cooperate with said scale, driving connections between said movable indicating means and said second drum, and manually operable means to actuate said movable indicating means.

12. A bomb sight, comprising a stabilized member, tiltable about an axis, a sighting device tiltably mounted on said member, a rack carried by said device, a pinion engaging said rack, a first drum mounted on said member and connected to said pinion, a second drum mounted on an unstabilized member, a flexible member wound upon and having its ends connected to said drums, said flexible member passing through a tilt axis of said stabilized member, continuously acting means tending to move said device in opposition to said flexible member, a range angle scale mounted on an unstabilized member, movable indicating means disposed to cooperate with said scale, driving connections between said movable indicating means and said second drum, and variable speed power means to actuate said movable indicating means.

13. A bomb sight, comprising a stabilized member, tiltable about an axis, a sighting device tiltably mounted on said member, a rack carried by said device, a pinion engaging said rack, a first drum mounted on said member and connected to said pinion, a second drum mounted on an unstabilized member, a flexible member wound upon and having its ends connected to said drums, said flexible member passing through a tilt axis of said stabilized member, continuously acting means tending to move said device in opposition to said flexible member, a range angle scale mounted on an unstabilized member, movable indicating means disposed to cooperate with said scale, driving connections between said movable indicating means and said second drum, and both variable speed power means and manually operable means to actuate said movable indicating means.

14. A bomb sight, comprising a sighting device, stabilizing means therefor, a casing wherein the aforesaid parts are mounted, a range angle scale mounted on said casing, a rotatable indicator ring carried by said casing and having a reference point to cooperate with said scale, a range quadrant mounted adjacent said scale and having on it a reference line to indicate a range angle on said scale, a motor mounted on said casing, means to regulate the speed of said motor proportionately to different altitudes, a disk driven by said motor, a roller in frictional contact with said disk, an internally threaded sleeve on which said roller is mounted, a longitudinally slidable ground speed bar, means including a differential gear forming a driving connection between said roller and said ground speed bar, means forming a driving connection between said ground speed bar and said indicator ring, an operating knob, means forming an engageable and disengageable driving connection between said knob and said ground speed bar, a rotatable screw member on which said internally threaded sleeve is mounted, a synchronizing knob, means connecting said synchronizing knob and said screw whereby rotation of the former rotates the latter, a longitudinally slidable range bar, driving connection means between said range bar and said screw, a pin on said range bar disposed in a radial slot in said range quadrant whereby movement of said range bar rotates said quadrant, a trail angle scale, a lever movable thereover, and connecting means between said lever and said screw whereby movement of said lever rotates said screw and moves said quadrant but movement of said screw does not move said lever.

15. A bomb sight, comprising a sighting device, stabilizing means therefor, a range scale adjacent thereto, means operatively connected to and movable synchronously with said device to indicate on said scale the angular position of said device, variable speed power means connected to move said device and the first mentioned means, means to set the speed of said power means proportionately to different altitudes; other speed varying means comprising a driven disk, a roller in frictional contact therewith, a rotatable screw, a sleeve in threaded engagement with said screw upon which said roller is mounted whereby rotation of said screw moves said roller radially of said disk; a portion extending from said screw, a pinion fixed on said portion, a housing rotatable on said portion and enclosing said pinion, a shaft journalled in said housing, a gear fixed on said shaft and meshed with said pinion, a second pinion also fixed on said shaft, a third pinion rotatable on said portion, a second gear fixed on said third pinion and meshed with said second pinion, a lever fixed to said housing, a trail angle scale over which said lever is movable, means to fix said lever in any desired position on said scale, a slidably mounted range bar having a rack engaged with said third pinion, a pin on said bar, a range quadrant rotatably mounted adjacent said range scale and having a radial slot in which said pin is disposed and a reference mark to indicate a range angle on said range scale, said quadrant being movable by movement of said lever, a synchronizing knob, means connecting said knob and said screw whereby turning said knob rotates said screw and moves said quadrant, an operating knob, and means connected to said operating knob and adapted to place said knob in operative connection with the actuating means of said first mentioned means.

16. A bomb sight, comprising a sighting device, stabilizing means therefor, a casing wherein the aforesaid parts are mounted, a range angle scale mounted on said casing, a rotatable indicator ring carried by said casing and having a reference point to cooperate with said scale, a range quadrant mounted adjacent said scale and having on it a reference line to indicate a range angle on said scale, a motor mounted on said casing, means to regulate the speed of said motor proportionately to different altitudes, a disk driven by said motor, a roller in frictional contact with said disk, an internally threaded sleeve on which said roller is mounted, a longitudinally slidable ground speed bar, means including a differential gear forming a driving connection between said roller and said ground speed bar, means forming a driving connection between said ground speed bar and said indicator ring, means forming an operating connection between said sighting device and said indicator ring, an operating knob, means forming an engageable and disengageable driving connection between said knob and said ground speed bar, and means acting simultaneously to set said range quadrant to indicate a range angle and to vary the speed at which the ground speed bar is driven.

17. A bomb sight, comprising a sighting device, stabilizing means therefor, a casing wherein the aforesaid parts are mounted, a range angle scale mounted on said casing, a rotatable indicator ring carried by said casing and having a reference point to cooperate with said scale, a motor mounted on said casing, means to regulate the speed of said motor proportionately to different altitudes, a disk driven by said motor, a roller in frictional contact with said disk, means for moving said roller radially of said disk, a longitudinally slidable ground speed bar, means adapted to form a driving connection between said roller and said bar, means forming a driving connection between said ground speed bar and said indicator ring, operative connecting means between said ring and said device, and manually operable means adapted to move said ground speed bar by manual manipulation or to cause said bar to be driven by said roller.

18. In a bomb sight, a sighting device, stabilizing means therefor, means to drive said device in synchronism with apparent movement of a target, means to vary the speed of said driving means proportionately to the altitude, other means to vary said speed proportionally to the ground speed, means to indicate a range angle correct for the speed and altitude of the craft carrying the sight, and means to set said indicating means and simultaneously adjust the second mentioned speed varying means.

19. In a bomb sight, a sighting device, stabilizing means therefor, means to drive said device in synchronism with apparent movement of a target, means to vary the speed of said driving means proportionately to the altitude, other means to vary said speed proportionally to the ground speed, means to indicate a range angle correct for the speed and altitude of the craft carrying the sight, means to set said indicating means and simultaneously adjust the second mentioned means and means to correct said setting for the trail of a bomb.

20. In a bomb sight, a sighting device, stabilizing means therefor, means to drive said device in synchronism with apparent movement of a target, means to vary the speed of said driving means proportionately to the altitude, other means to vary said speed proportionally to the ground speed, means to indicate a range angle correct for the speed and altitude of the craft carrying the sight, means to set said indicating means and simultaneously adjust the second mentioned means, means to correct said setting for the trail of a bomb and means to indicate a cross-trail correction.

21. In a bomb sight, a sighting device, stabilizing means therefor, driving means for said device, means to vary the speed of said driving means to move said device in synchronism with the apparent movement of a target, a range quadrant having a notch in its edge and operatively connected to said speed varying means to be set to indicate a range angle by manipulation of said speed varying means, a member operatively connected to said device to move in synchronism therewith, a switch block mounted on said member, a fixed contact element in said block, a movable contact element pivotally mounted in said block, means tending to move said movable element into contact with said fixed element, restraining means to prevent such movement of said movable element, and a lever connected to the pivot of said movable element having a portion to ride on said quadrant to prevent said movable element from making contact with said fixed element but which drops in said notch and permits the making of such contact when said restraining means is set in its inoperative position, the said lever being so related to said device that such contact is made at the instant said device is directed at the range angle indicated by said quadrant, the making of such contact closing a circuit through a bomb releasing mechanism.

22. In a bomb sight, a sighting device, stabilizing means therefor, driving means for said device, means to vary the speed of said driving means to move said device in synchronism with the apparent movement of a target, range angle indicating means operatively connected to said speed varying means to be set to indicate a range angle by manipulation of said speed varying means, and means operatively related to said device and said indicating means to actuate a bomb releasing mechanism at the instant said device is directed at the range angle indicated by said indicating means.

23. In a bomb sight, a sighting device, a range angle indicating element, a motor, a disk driven thereby, a roller in frictional contact with said disk, an elongated pinion forming a prolongation of the shaft of said roller, an internally threaded sleeve whereon said roller and elongated pinion are mounted, a screw in said sleeve, a pinion connected to said screw, a longitudinally slidable bar having a rack meshed with said pinion, connecting means between said bar and said range angle indicating device, a first gear meshed with said elongated pinion, a second pinion connected to said gear, a second gear meshed with said second pinion, a differential gear including a bevel gear that is connected to said second gear, a second bevel gear in said differential having an oppositely facing bevel gear secured thereto, a shaft connected to the pinions of said differential, a third pinion carried by said shaft, a second longitudinally slidable bar having a rack engaging said third pinion, operative connecting means between said second bar and said device, manually operable means engageable with the second bevel gear of said differential whereby said second bevel gear may be rotated or held together against rotation, and manually operable means to rotate said screw to move said range indicating element and shift said roller radially of said disk.

24. In a bomb sight, a sighting device, a range angle indicating element, means for operating said device either mechanically or manually, and manually operated means for simultaneously changing the speed of mechanical operation of said device and setting said range angle indicating element.

25. In a bomb sight, a sighting device, a range angle indicating element, mechanical means for operating said device, and means for simultaneously setting said element to indicate the range angle and synchronizing the movement of said device with the apparent movement of a target.

26. In a bomb sight, a sighting device, a range angle indicating element, means for operating said device either mechanically or manually, manually operated means for simultaneously changing the speed of mechanical operation of said device and setting said element to indicate the range angle, and means for correcting said setting for the trail of a bomb.

27. In a bomb sight, a sighting device, a range angle indicating element, means for operating said device either mechanically or manually, manually operated means for simultaneously changing the speed of mechanical operation of said device and setting said element to indicate the range angle, means for correcting said setting for the trail of a bomb and means for indicating a cross-trail correction.

28. In a bomb sight, a sighting telescope having a reticule bearing an athwart line, a vertical line, and a short vertical line intersecting said athwart line on each side of said vertical line at equal distances therefrom, a transparent plate carried by a fixed portion of said sight and having thereon lines similar to the lines of the said reticule, a fixed member extending outwardly from said plate and having unit spaced apart holes corresponding to various trail angles of a bomb, a lever disposed on said member and having holes spaced to correspond to those in said member, pivot means for said lever adapted to be inserted in corresponding holes in said member and said lever, the after end of said lever being disposed under said plate and having on it a reference mark, the said lever being held parallel to the fore and aft line of a craft on which the sight is carried, whereby the position of said reference mark with respect to the lines on said plate indicates the position of the image of a target with respect to said reticule lines to correct for cross-trail in dropping a bomb.

29. In a bomb sight, a sighting telescope having a plurality of reticule lines, a plate carried by a fixed portion of the sight having on it a duplication of the said reticule lines, a member having a pivot adjustable to correspond to the trial angle of a bomb and a reference mark disposed in overlapping relation with said lines on the plate, said member being held parallel to a fixed line of the craft whereon the sight is carried whereby the position of said mark with respect to the lines on said plate indicates the position of the image of a target with respect to the reticule lines in said telescope to correct for cross-trail.

30. In a bomb sight, a sighting device, operating means therefor, a range angle indicating element, means comprising a rotatable screw for setting said element to indicate a range angle and simultaneously varying the speed of said operating means to synchronize the movement of said device with the apparent movement of a target, and means to correct said setting for trail of a bomb comprising a first pinion connected to said screw, a gear housing disposed therearound, a shaft journalled in said housing, a gear secured on said shaft and meshed with said first pinion, a second pinion also secured on said shaft, a third pinion rotatable about the axis of said first pinion, a second gear secured on said third pinion in mesh with said second pinion, a trail angle scale, a lever fixed to said housing and movable over said scale, and operative connecting means between said third pinion and said element whereby movement of said lever changes the setting of said element.

31. In a bomb sight, a sighting telescope mounted to rotate about an axis at right angles to its optical axis, means to stabilize said telescope, unstabilized driving mechanism adjustable to rotate said telescope about said axis at a rate that is a function of the speed and the altitude of an aircraft upon which said sight is mounted, and means to adjust said driving mechanism to correct the movement of said telescope for the trail of a bomb.

32. In a bomb sight, a sighting telescope mounted to rotate about an axis at right angles to its optical axis, means to stabilize said telescope, unstabilized driving mechanism adjustable to rotate said telescope about said axis at a rate that is a function of the speed and the altitude of an aircraft upon which said sight is mounted, means to adjust said driving mechanism to correct the movement of said telescope for the trail of a bomb, and means to correct said movement for the cross-trail of said bomb.

33. In a bomb sight, a gyroscope including a housing having a rib thereon, a cardan in which said gyroscope is supported for rotation about an axis; means to precess said gyroscope in one direction comprising gear teeth on said cardan, a gear engageable with said teeth and means to rotate said gear; and means to precess said gyroscope at right angles to said one direction including a leaf spring movable to apply pressure to said rib and means to move said spring to bear against said rib.

34. A bomb sight, comprising sighting telescope, cross-trail correction means including a proportionally variable lever, means to hold said lever parallel to the fore and aft line of a craft upon which said sight is mounted, means to regulate the angular displacement of said lever with respect to the body of said sight and indicating means associated with said lever to show the position a target should occupy in the field of the telescope.

35. A bomb sight, comprising a movably mounted sighting telescope, means to move said telescope to keep a target in the field thereof, trail correction means to impart a correction to said telescope moving means and cross-trail correction means including an indicating device to show the position a target should occupy in the field of the telescope.

THEODORE H. BARTH.

REFERENCES CITED

The following references are of record in the file of this patent:

UNITED STATES PATENTS

| Number | Name | Date |
|---|---|---|
| 1,446,280 | Titterington | Feb. 20, 1923 |
| 1,468,712 | Ford | Sept. 25, 1923 |
| 1,688,559 | Sperry | Oct. 23, 1928 |
| 1,804,679 | Estoppey | May 12, 1931 |
| 1,936,576 | Barth | Nov. 28, 1933 |
| 2,027,348 | Seversky | Jan. 7, 1936 |
| 2,118,041 | Estoppey | May 24, 1938 |

FOREIGN PATENTS

| Number | Country | Date |
|---|---|---|
| 14,060 | Great Britain | 1915 |